United States Patent
Adachi

(10) Patent No.: US 9,758,086 B2
(45) Date of Patent: Sep. 12, 2017

(54) VEHICLE LAMP CONTROL DEVICE

(71) Applicant: HONDA MOTOR CO., LTD., Minato-ku, Tokyo (JP)

(72) Inventor: Masahiko Adachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/023,043

(22) PCT Filed: Aug. 18, 2014

(86) PCT No.: PCT/JP2014/071587
§ 371 (c)(1),
(2) Date: Mar. 18, 2016

(87) PCT Pub. No.: WO2015/040993
PCT Pub. Date: Mar. 26, 2015

(65) Prior Publication Data
US 2016/0229331 A1 Aug. 11, 2016

(30) Foreign Application Priority Data
Sep. 20, 2013 (JP) .................. 2013-195750

(51) Int. Cl.
*B60Q 1/14* (2006.01)
*H04N 9/04* (2006.01)

(52) U.S. Cl.
CPC ........ *B60Q 1/143* (2013.01); *B60Q 2300/052* (2013.01); *B60Q 2300/314* (2013.01); *B60Q 2300/337* (2013.01); *B60Q 2300/3321* (2013.01); *H04N 9/045* (2013.01)

(58) Field of Classification Search
CPC .......................... B60Q 1/143; B60Q 2300/052
See application file for complete search history.

(56) References Cited

U.S. PATENT DOCUMENTS

| | | | | |
|---|---|---|---|---|
| 5,537,003 A | * | 7/1996 | Bechtel | H05B 37/0218 307/10.8 |
| 7,634,107 B2 | | 12/2009 | Fujii | |
| 2008/0100225 A1 | * | 5/2008 | Fujie | B60Q 1/1423 315/156 |

(Continued)

FOREIGN PATENT DOCUMENTS

| | | |
|---|---|---|
| JP | H01-309836 A | 12/1989 |
| JP | H05-046571 U | 6/1993 |
| JP | 2007-030734 A | 2/2007 |

(Continued)

*Primary Examiner* — Truc M Do
*Assistant Examiner* — Jess Whittington
(74) *Attorney, Agent, or Firm* — Carrier Blackman & Associates, P.C.; Joseph P. Carrier; Jingli Wang

(57) ABSTRACT

A vehicle lamp control device (1) includes: an artificial light determination unit (82) which, on the basis of an image of the surroundings of a vehicle C captured by a camera (11) mounted on the vehicle C, determines whether or not the vehicle C is located in an artificial light environment, i.e., an environment illuminated by artificial light which is light provided by artificial illumination; and a lamp controller (81) which, on the basis of the result of determination by the artificial light determination unit (82), controls turning on or turning off of a lamp (12) which outputs an illumination light to the outside of the vehicle C.

5 Claims, 12 Drawing Sheets

(56) References Cited

U.S. PATENT DOCUMENTS

2014/0015406 A1\*  1/2014  Fujiwara .............. B60Q 1/0023
                                                    315/77
2014/0293055 A1\*  10/2014  Otsuka ................... B60Q 1/143
                                                    348/148

FOREIGN PATENT DOCUMENTS

| JP | 2008-056056 A | 3/2008 |
| JP | 2008-080932 A | 4/2008 |
| JP | 2009-280047 A | 12/2009 |
| JP | 2012-171485 A | 9/2012 |

\* cited by examiner

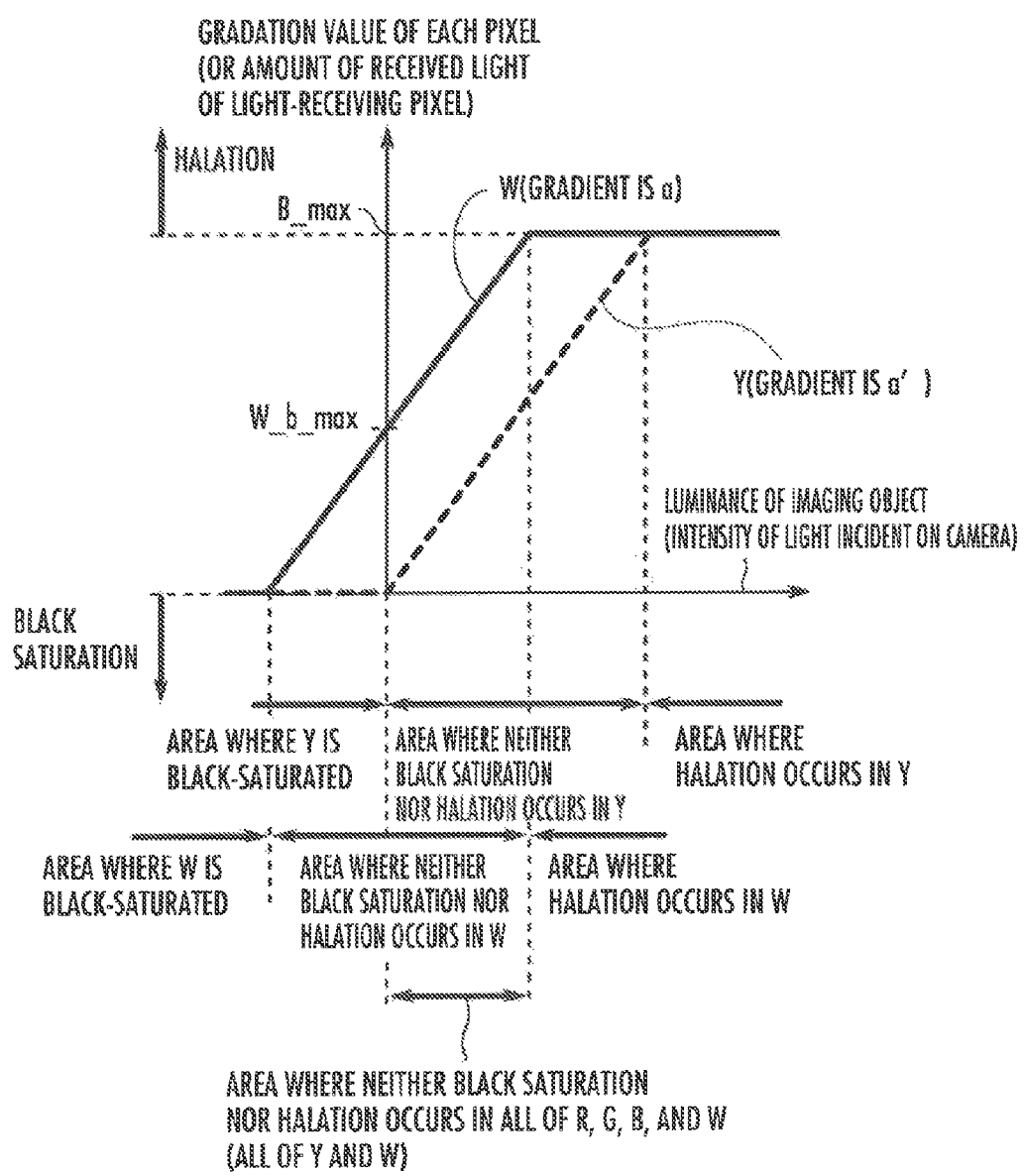

VEHICLE LAMP CONTROL DEVICE

TECHNICAL FIELD

The present invention relates to a vehicle lamp control device which controls a lamp (headlight or the like) outputting illumination light to the outside of the vehicle.

BACKGROUND ART

Conventionally, there is known a vehicle lamp control device which controls a lamp outputting illumination light to the outside of the vehicle (Refer to, for example, Patent Literature 1 or Patent Literature 2). The vehicle lamp control device turns on the lamp when the illuminance of the surroundings of the vehicle is equal to or lower than a predetermined value.

Furthermore, there is known another vehicle lamp control device (Refer to, for example, Patent Literature 3). The vehicle lamp control device calculates an average brightness in each area regarding a road surface area corresponding to a road part ahead of the vehicle, a vanishing point area including a vanishing point, and an upper sky area corresponding to an upper sky part on the basis of an image captured by an vehicle mounted camera. Moreover, the vehicle lamp control device turns on a lamp which outputs illumination light to the outside of the vehicle when it is determined that all the areas are dark.

CITATION LIST

Patent Literatures

Patent Literature 1: Japanese Patent Application Laid-Open No. H1-309836
Patent Literature 2: Japanese Utility Model Application Laid-Open No. H5-46571
Patent Literature 3: Japanese Patent Application Laid-Open No. 2009-280047

SUMMARY OF INVENTION

Technical Problem

Incidentally, even if the surroundings of the vehicle are relatively light, a driver feels like using a lamp to output illumination light to the outside or it is desirable to output the illumination light in some situations. The situations include, for example, a situation where the vehicle is running in a tunnel in which high-intensity illumination is used as artificial illumination or a situation where the vehicle is running in an environment illuminated by high-intensity illumination at night. In such a situation, particularly near the illumination, the surroundings of the vehicle are relatively light in some cases. Therefore, in the vehicle lamp control devices described in Patent Literatures 1 to 3, the lamp is not automatically turned on or the turned-on state of the lamp cannot be maintained in some cases in such situation.

The present invention has been provided in view of the above problems. Therefore, it is an object of the present invention to provide a vehicle lamp control device capable of controlling a lamp more appropriately.

Solution to Problem

The present invention includes: an artificial light determination unit which determines whether or not a vehicle is located in an artificial light environment which is an environment illuminated by artificial light which is artificial illumination light, based on an image of surroundings of the vehicle captured by a camera mounted on the vehicle; and a lamp controller which controls turning on or turning off of a lamp which outputs illumination light to outside of the vehicle based on a determination result by the artificial light determination unit (First aspect of invention).

In the first aspect of the invention, the artificial light determination unit determines whether or not the vehicle is located in the artificial light environment on the basis of the image captured by the camera. The lamp controller then controls the turning on or turning off of the lamp on the basis of the result of determination of the artificial light determination unit. Thereby, even if the vehicle is located in the artificial light environment, the turning on or turning off of the lamp is able to be controlled with whether the vehicle is located in the artificial light environment being appropriately reflected on the control.

In the above first aspect of the invention, preferably the image captured by the camera is a color image; and the artificial light determination unit is configured to determine whether or not the vehicle is located in the artificial light environment based on color information of the color image (Second aspect of the invention).

According to the second aspect of the invention, it is possible to determine whether or not the vehicle is located in an artificial light environment by determining a difference between the wavelength distribution of the artificial light (in other words, light illuminating the environment in the artificial light environment) and the wavelength distribution of light other than the artificial light (in other words, light illuminating the environment in the environment other than the artificial light environment) on the basis of the color information of the color image.

In the above first or second aspect of the invention, the lamp controller may be configured to turn on the lamp in a case where the artificial light determination unit determines that the vehicle is located in the artificial light environment (Third aspect of the invention).

According to the third aspect of the invention, the lamp is able to be in a turned on state independently of the brightness around the vehicle in the case where the vehicle is located in the artificial light environment.

In the above first or second aspect of the invention, the invention may be configured to include: a turn on/off determination unit which determines to change the lamp from a turned-off state to a turned-on state in a case where the brightness around the vehicle has changed from brightness higher than a predetermined first threshold value to brightness equal to or lower than the first threshold value and determines to change the lamp from the turned-on state to the turned-off state in a case where the brightness around the vehicle has changed from brightness lower than the second threshold value which is higher than the first threshold value to brightness equal to or higher than the second threshold value; and a threshold value modification unit which modifies at least one of the first threshold value and the second threshold value in a case where the artificial light determination unit determines that the vehicle is located in the artificial light environment, wherein the lamp controller controls the turning on or turning off of the lamp based on the determination result of the turn on/off determination unit (Fourth aspect of the invention).

According to the fourth aspect of the invention, the threshold value modification unit changes at least one of the first threshold value and the second threshold value in the case where the vehicle is located in the artificial light environment. Upon the change in the first threshold value, the turn on/off determination unit is able to determine to turn on the lamp by appropriately reflecting whether or not the vehicle is located in the artificial light environment, and consequently the lamp controller is able to turn on the lamp. Moreover, upon the change in the second threshold value, the turn on/off determination unit is able to determine to turn off the lamp by appropriately reflecting whether or not the vehicle is located in the artificial light environment, and consequently the lamp controller is able to turn off the lamp. Thus, the fourth aspect of the invention is able to control the lamp more appropriately.

Furthermore, when the turn on/off determination unit determines to turn off the lamp after the lamp is turned on from the turned-off state, it means that the brightness around the vehicle has increased from the brightness equal to or lower than the first threshold value to the second threshold value (a value higher than the first threshold value) or higher. Moreover, when the turn on/off determination unit determines to turn on the lamp after the lamp is turned off from the turned-on state, it means that the brightness around the vehicle has decreased from the brightness equal to or higher than the second threshold value to the first threshold value (a value lower than the second threshold value) or lower. Therefore, switching of the lamp between the turned-off state and the turned-on state requires a change in the brightness by a difference between the first threshold value and the second threshold value or more. Thus, it is possible to prevent the turn on/off action of the lamp from being frequently repeated.

In the above fourth aspect of the invention, preferably the threshold value modification unit is configured to modify at least one of the first threshold value and the second threshold value so that at least one of the first threshold value and the second threshold value is higher than in a case where the vehicle is determined not to be located in the artificial light environment, in the case where the artificial light determination unit determines that the vehicle is located in the artificial light environment (Fifth aspect of the invention).

According to the fifth aspect of the invention, the threshold value modification unit modifies at least one of the first threshold value and the second threshold value so that at least one of the first threshold value and the second threshold value is higher in the case where the vehicle is located in the artificial light environment compared to the case where the vehicle is not located in the artificial light environment.

In the case where the first threshold value is modified so as to be higher, the lamp is easily changed from the turned-off state to the turned-on state even if the brightness around the vehicle is relatively high. Moreover, in the case where the second threshold value is modified so as to be higher, the lamp is easily maintained in the turned-on state even if the brightness around the vehicle is relatively high.

Thus, according to the above configuration, the lamp is able to be automatically turned on or maintained in the turned-on state also in a situation where the vehicle is located in an artificial light environment with high-intensity illumination used therein, such as a situation where a driver feels like outputting illumination light to the outside by using a lamp or where it is desirable to output the illumination light to the outside even in the case where the brightness around the vehicle is relatively high.

In the fourth or fifth aspect of the invention, the threshold value modification unit is preferably configured to modify at least one of the first threshold value and the second threshold value so that a difference between the first threshold value and the second threshold value is larger in the case where the artificial light determination unit determines that the vehicle is located in the artificial light environment than in the case where the vehicle is determined not to be located in the artificial light environment, (Sixth aspect of the invention).

In the case where the vehicle is located in the artificial light environment, the closer to the illumination the vehicle is located, brightness around the vehicle increases, and the farther from the illumination the vehicle is located, brightness around the vehicle decreases. Therefore, in the case where the vehicle is running in the artificial light environment, the brightness around the vehicle often largely varies.

According to the sixth aspect of the invention, the difference between the first threshold value and the second threshold value increases in the case where the vehicle is located in the artificial light environment, by which the brightness needs to change more largely when the lamp is turned off after a change from the turned-off state to the turned-on state and when the lamp is turned on after a change from the turned-on state to the turned-off state. Therefore, even in the case where the brightness around the vehicle frequently largely varies when the vehicle is running in the artificial light environment, it is possible to prevent the turn on/off action of the lamp from being frequently repeated.

BRIEF DESCRIPTION OF DRAWINGS

FIG. 14 is a diagram for describing artificial light environment determination of another embodiment.

DESCRIPTION OF EMBODIMENTS

[1. Configuration of Vehicle Lamp Control Device]

The following describes a vehicle lamp control device 1 (hereinafter, simply referred to as "control device") of an embodiment of the present invention.

Figure 1:
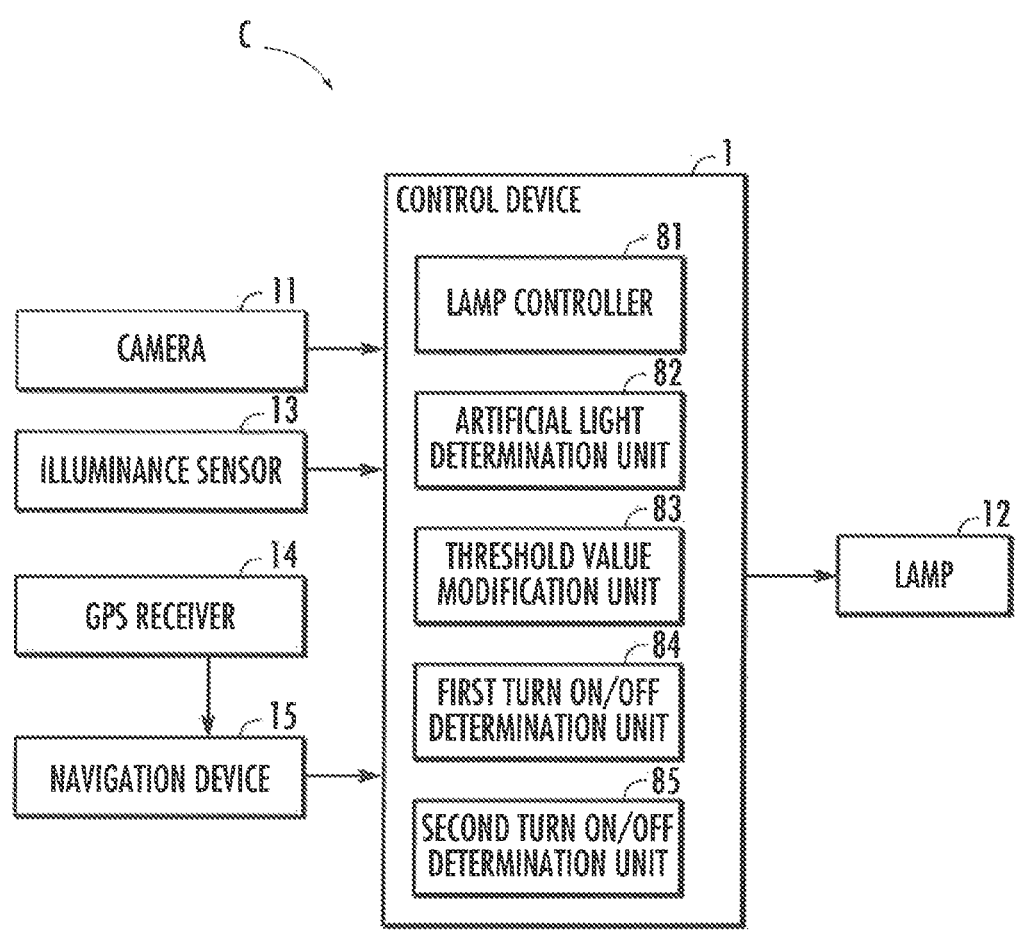
FIG. 1 is a configuration diagram illustrating a vehicle lamp control device according to an embodiment of the present invention.
Figure 2:
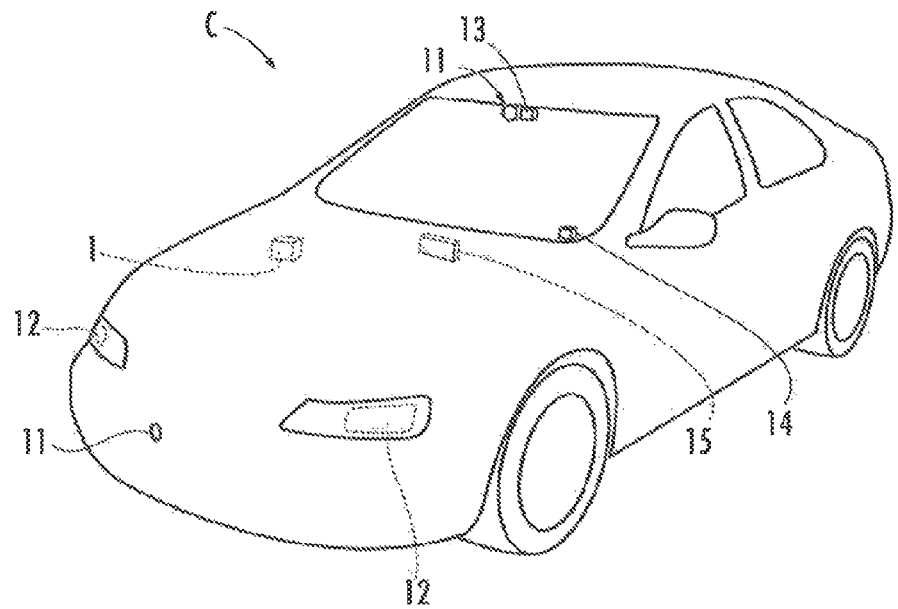
FIG. 2 is an explanatory diagram illustrating a manner for mounting the vehicle lamp control device illustrated in FIG. 1 onto a vehicle.

Referring to FIGS. 1 and 2, the vehicle C on which the control device 1 is mounted includes a camera 11, a lamp 12, an illuminance sensor 13, a global positioning system (GPS) receiver 14, and a navigation device 15.

The control device 1 is composed of an electronic control unit having a CPU, a memory, and the like, which are not illustrated. The control device 1 accepts an input of signals output from the camera 11, the illuminance sensor 13, and the navigation device 15. Moreover, the control device 1 has functions serving as a lamp controller 81, an artificial light determination unit 82, a threshold value modification unit 83, a first turn on/off determination unit 84 (corresponding to "turn on/off determination unit" of the present invention), and a second turn on/off determination unit 85.

The camera 11 is arranged in the vicinity of an interior rear-view mirror (not illustrated) of the vehicle C (See FIG. 2). The camera 11 outputs a captured image, which has been obtained by capturing an image of the front view of the vehicle C, as a signal to the outside by using an imaging element (CCD, CMOS, or the like, not illustrated) in which a filter (not illustrated) is incorporated.

In this embodiment, the filter of the camera 11 includes color filters of three primary colors of red (R), green (G), and blue (B), more specifically three types of color filters capable of transmitting red, green, and blue lights (visible light), respectively. These color filters of three colors are mixed in a predetermined proportion for the light-receiving pixels constituting the imaging element and arranged in a predetermined form.

The proportion for mixing the colors and the arrangement of the color filters of three colors may be implemented in well-known various modes. Moreover, the color filters may be any other type of color filters (such as filters of three complementary primary colors, cyan [Cy], magenta [Mg], and yellow [Ye]), instead of color filters of red, green, and blue.

Furthermore, when capturing an image, the camera 11, first, acquires a so-called raw image, which is obtained according to the amount of received light of each light-receiving pixel (any one of the above three colors is allocated to one light-receiving pixel). In addition, the camera 11 performs a so-called demosaicing process for the raw image to allocate the color gradation values of the respective colors (gradation values of red, green, and blue colors: hereinafter, these colors are referred to as R value, G value, and B value, respectively) to the positions of each of the light-receiving pixels, thereby generating a color image.

Thereafter, the camera 11 adjusts white balance by multiplying color gains, which are the correction coefficients of the respective colors for each pixel of the color image. The camera 11 outputs the information on the color gains at that time included in the header of the captured image.

Hereinafter, the red color gain, the green color gain, and the blue color gain are referred to as "red gain Rgain," "green gain Ggain," and "blue gain Bgain," respectively.

The lamp 12 is a light which outputs illumination light to the outside of the vehicle C. Although the lamp is a headlight in this embodiment, the lamp may be configured, for example, by using at least one of the headlight, a side marker lamp, a front fog lamp, a rear fog lamp, and a tail lamp.

The illuminance sensor 13 detects the illuminance I of the surroundings of the vehicle C (the illuminance I corresponds to "brightness" of the present invention. Hereinafter, it is referred to as "surrounding illuminance"). The illuminance sensor 13 outputs a signal indicating the detected surrounding illuminance I to the outside. In addition, the illuminance sensor 13 is provided in the vicinity of the interior rear-view mirror (not illustrated) of the vehicle C. The illuminance sensor 13 may be provided in the upper part of the instrument panel.

A GPS receiver 14 receives a signal from a GPS satellite and detects the position of the vehicle C. The GPS receiver 14 outputs a signal indicating the position of the vehicle C to the outside.

The navigation device 15 displays an image in which the position of the vehicle C is displayed on a map on a display device (not illustrated) of the navigation device 15 on the basis of the signal output from the GPS receiver 14 and map information (including information indicating the position of a tunnel) stored in a storage medium such as a memory (not illustrated) included in the navigation device 15.

Moreover, the navigation device 15 outputs a signal indicating that the vehicle C is located at a tunnel entrance to the outside when recognizing that the vehicle C is located at the tunnel entrance from the signal output from the GPS receiver 14 and the map information.

[2. Control Processing]

Subsequently, the control processing performed by the control device 1 will be described below. The control processing performed by the control device 1 includes lamp control processing (See FIG. 3), first turn on/off determination processing (See FIG. 4), threshold value modification processing (See FIG. 6), artificial light environment determination processing (See FIG. 7), and second turn on/off determination processing (See FIG. 8).

The lamp control processing is processing of controlling the turning on and turning off of the lamp 12. The lamp control processing corresponds to control processing performed by the lamp controller 81. In the lamp control processing, the turning on and turning off of the lamp 12 are controlled on the basis of the result of determination of the first turn on/off determination processing and the result of determination of the second turn on/off determination processing.

More specifically, the lamp control processing is processing of turning on the lamp 12 when it is determined that the lamp 12 should be in a turned-on state in at least one of the first turn on/off determination processing and the second turn on/off determination processing and turning off the lamp 12 when it is determined that the lamp 12 should be in a turned-off state in both of the first turn on/off determination processing and the second turn on/off determination processing.

As described above, in the lamp control processing, the lamp 12 is controlled on the basis of the result of determination of the two different processes, the first turn on/off determination processing and the second turn on/off determination processing. This enables the control of the lamp 12 with higher reliability.

The first turn on/off determination processing is processing of determining whether the lamp 12 should be in a turned-on state or in a turned-off state. The first turn on/off determination processing corresponds to control processing performed by the first turn on/off determination unit 84. In the first turn on/off determination processing, a first threshold value I_th1 and a second threshold value I_th2 are used as the threshold values of the surrounding illuminance I (See FIG. 5A). The second threshold value I_th2 is set higher than the first threshold value I_th1.

The first threshold value I_th1 is a threshold value of the surrounding illuminance I at which the control device 1 determines to change the lamp 12 from the turned-off state to the turned-on state. The control device 1 determines to change the lamp 12 from the turned-off state to the turned-on state as the first turn on/off determination processing when the surrounding illuminance I has changed from the illuminance higher than the first threshold value I_th1 to the illuminance equal to or lower than the first threshold value I_th1. The second threshold value I_th2 is a threshold value of the surrounding illuminance I at which the control device 1 determines to change the lamp 12 from the turned-on state to the turned-off state. The control device 1 determines to change the lamp 12 from the turned-on state to the turned-off state as the first turn on/off determination processing when the surrounding illuminance I has changed from the illuminance lower than the second threshold value I_th2 to the illuminance equal to or higher than the second threshold value I_th2.

Thereby, when the control device 1 determines to turn off the lamp 12 after the lamp 12 has changed from the turned-off state to the turned-on state, it means that the surrounding illuminance I has increased from illuminance equal to or lower than the first threshold value I_th1 to illuminance equal to or higher than the second threshold value I_th2. Moreover, when the control device 1 determines to turn on the lamp 12 after the lamp 12 has changed from the turned-on state to the turned-off state, it means that the surrounding illuminance I has decreased from illuminance equal to or higher than the second threshold value I_th2 to illuminance equal to or lower than the first threshold value I_th1. In this manner, to switch the lamp 12 from one of the turned-off state and the turned-on state to the other, the surrounding illuminance I needs to vary by more than a difference between the first threshold value I_th1 and the second threshold value I_th2. Therefore, it is possible to prevent the turn on/off action of the lamp 12 from being frequently repeated.

The threshold value modification processing is processing of changing the above first threshold value I_th1 and second threshold value I_th2 to threshold values I_th1_A and I_th2_A for an artificial light environment in a situation regarded as an environment illuminated by artificial light which is artificial illumination light (hereinafter, referred to as "artificial light environment") and changing the above first threshold value I_th1 and second threshold value I_th2 to threshold values I_th1_N and I_th2_N for a natural light environment in a situation regarded as an environment other than the artificial light environment (the processing of changing the threshold values corresponds to control processing performed by the threshold value modification unit 83).

Note here that the situation regarded as the artificial light environment is a situation determined to be an artificial light environment at least by the artificial light environment determination processing. Moreover, the situation not regarded as the artificial light environment is "a situation determined not to be an artificial light environment by the artificial light environment determination processing" or "a situation not determined to be an artificial light environment in step ST203 not at a tunnel entrance and in the previous control cycle (the last control cycle)."

The artificial light environment determination processing is processing of determining whether or not the environment is an artificial light environment on the basis of an image captured by the camera 11 (the processing corresponds to control processing performed by the artificial light determination unit 82).

The second turn on/off determination processing is processing of determining whether the state of the lamp 12 should be turned-on state or turned-off state on the basis of predetermined information (for example, the image captured by the camera 11), independently of the surrounding illuminance I. The second turn on/off determination processing corresponds to control processing performed by the second turn on/off determination unit 85.

[2-1. Lamp Control Processing]

Figure 3:
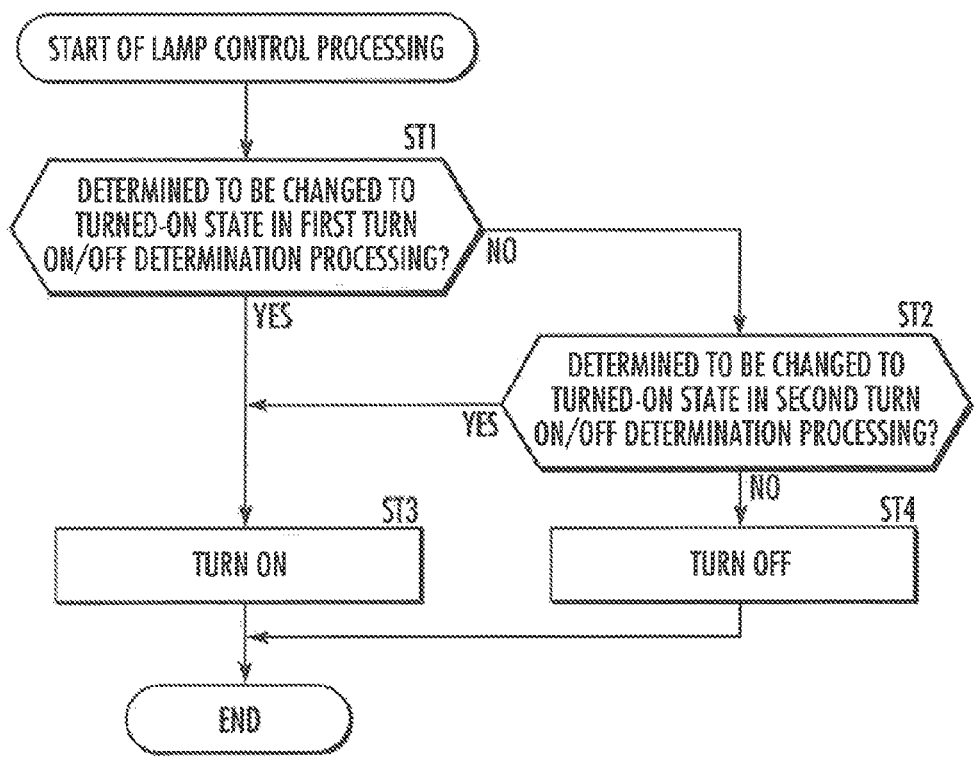
FIG. 3 is a flowchart illustrating a processing procedure for lamp control processing in the vehicle lamp control device illustrated in FIG. 1.

Referring to FIG. 3, the lamp control processing performed by the control device 1 will be described in detail below. The control device 1 performs the lamp control processing illustrated in the flowchart of FIG. 3 for each predetermined control cycle.

The control device 1 determines "whether the lamp 12 is determined to be changed to the turned-on state in the first turn on/off determination processing" in the first step ST1. If determining "the lamp 12 is not determined to be changed to the turned-on state in the first turn on/off determination processing" in step ST1, the control device 1 proceeds to step ST2. The control device 1 determines "whether or not the lamp 12 is determined to be changed to the turned-on state in the second turn on/off determination processing" in step ST2.

If determining "the lamp 12 is determined to be changed to be turned on in the first turn on/off determination processing" in step ST1 or determining "the lamp 12 is determined to be changed to be turned on in the second turn on/off determination processing" in step ST2, the control device 1 proceeds to step ST3 to turn on the lamp 12.

If determining "the lamp 12 is not determined to be changed to be turned on in the second turn on/off determination processing" in step ST2, the control device 1 proceeds to step ST4 to turn off the lamp 12. The control device 1 ends the flowchart if the processing of steps ST3 or ST4 is completed.

[2-2. First Turn on/Off Determination Processing]

Figure 4:
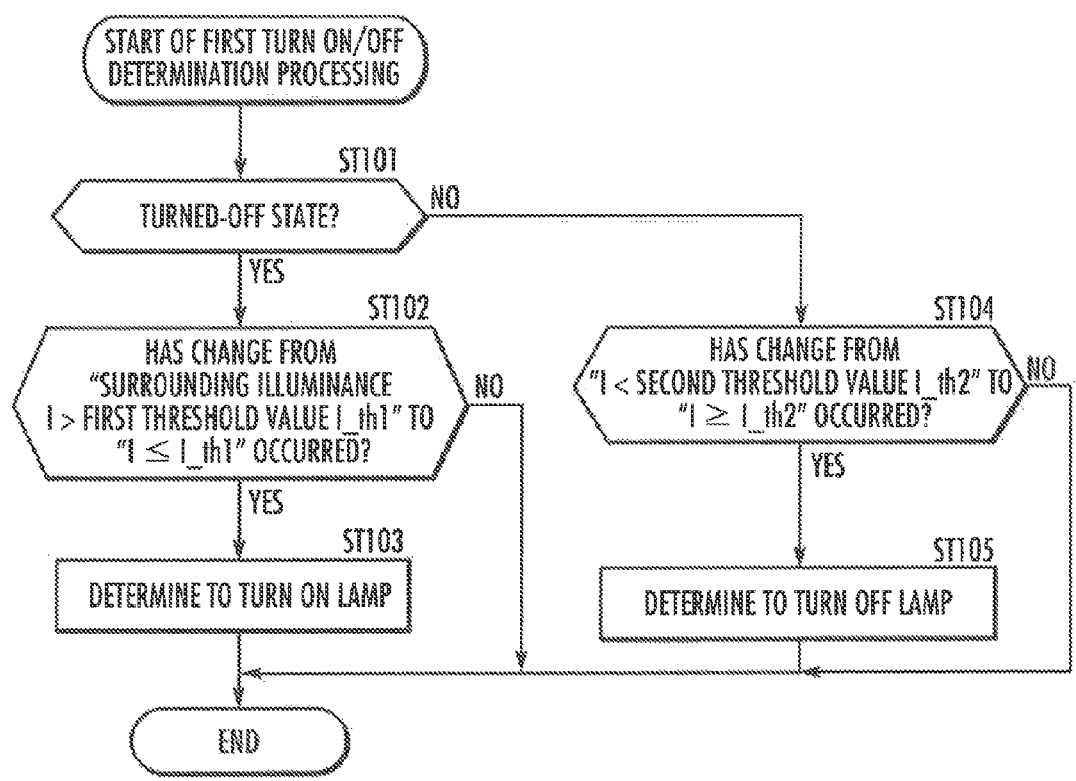
FIG. 4 is a flowchart illustrating a processing procedure for first turn on/off determination processing in the vehicle lamp control device illustrated in FIG. 1.
Figure 5A:
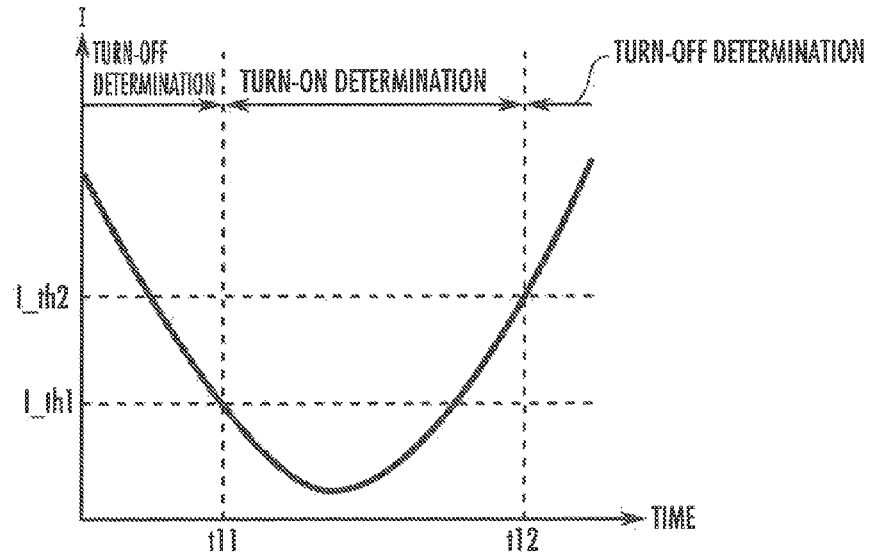
FIG. 5A is a diagram illustrating a surrounding illuminance I, a first threshold value I_th1, and a second threshold value I_th2.

Referring to FIGS. 4 and 5A, the following describes the details of the first turn on/off determination processing performed by the control device 1.

FIG. 5A is a diagram illustrating a time variation of the surrounding illuminance I. In FIG. 5A, the horizontal axis represents time and the vertical axis represents the surrounding illuminance I.

The control device 1 performs the first turn on/off determination processing of the flowchart illustrated in FIG. 4.

The control device 1 determines whether the lamp 12 is in the turned-off state in the first step ST101. If determining that the lamp 12 is in the turned-off state in step ST101, the control device 1 proceeds to step ST102.

The control device 1 determines whether or not the surrounding illuminance I has changed from a value higher than the first threshold value I_th1 to a value equal to or lower than the first threshold value I_th1 (hereinafter, the change in the surrounding illuminance I is referred to as "first change") in step ST102. If determining that the surrounding illuminance I has changed as the first change in step ST102, the control device 1 proceeds to step ST103 to determine that the lamp 12 should be turned on. If the processing of step ST103 ends or it is determined that the surrounding illuminance I has not changed as the first change in step ST102, the control device 1 ends the flowchart.

If determining that the lamp 12 is not in the turned-off state (in other words, the lamp is in the turned-on state) in step ST101 (for example, in the case of the state between time points t11 and t12 in FIG. 5A), the control device 1 proceeds to step ST104.

The control device 1 determines whether or not the surrounding illuminance I has changed from a value lower than the second threshold value I_th2 to a value equal to or higher than the second threshold value I_th2 (hereinafter, this kind of change of the surrounding illuminance I is referred to as "second change") in step ST104. If determining that the surrounding illuminance I has changed as the second change (for example, in the case of the state at time point t12 in FIG. 5A) in step ST104, the control device 1 proceeds to step ST105 to determine to turn off the lamp 12. If the processing of step ST105 is completed or it is determined that the surrounding illuminance I has not changed as the second change in step ST104, the control device 1 ends the flowchart.

[2-3. Threshold Value Modification Processing]

Figure 5B:
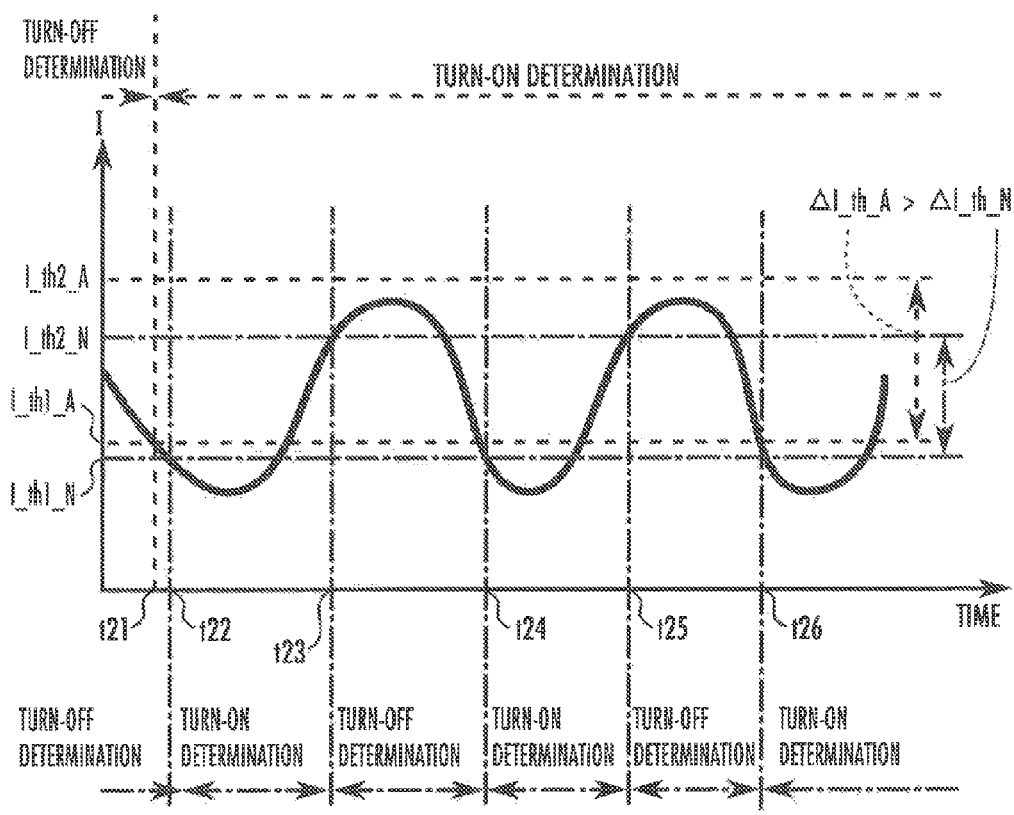
FIG. 5B illustrates a comparison between threshold values I_th1_A and I_th2_A for an artificial light environment and threshold values I_th1_N and I_th2_N for a natural light environment.
Figure 6:
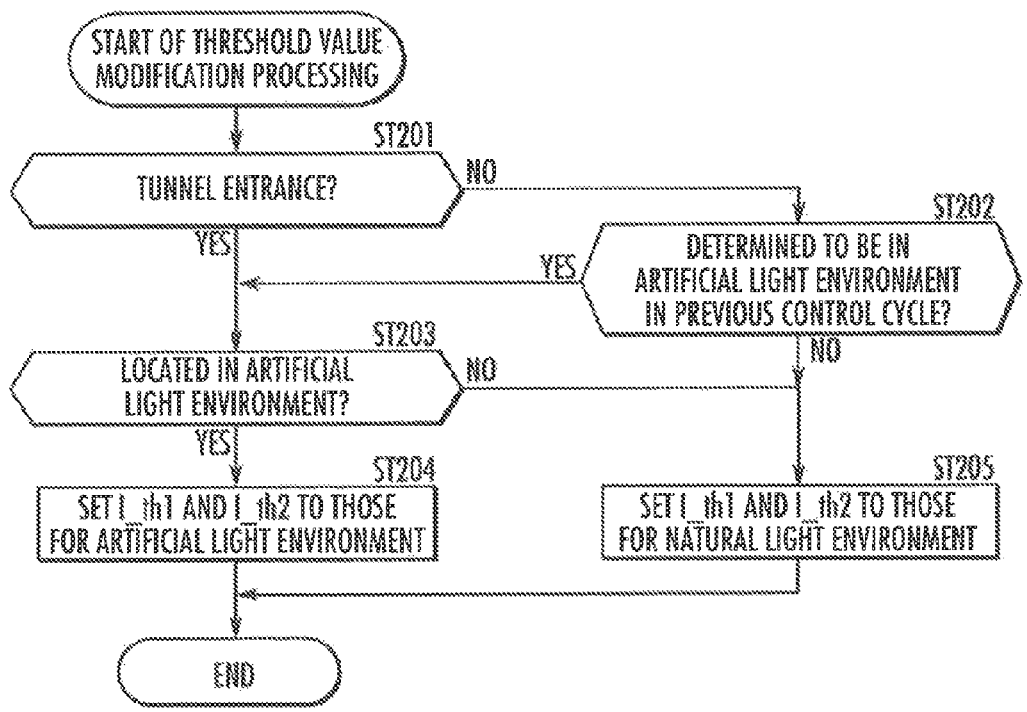
FIG. 6 is a flowchart illustrating a processing procedure for threshold value modification processing in the vehicle lamp control device illustrated in FIG. 1.

Referring to FIGS. 6 and 5B, the following describes the details of the threshold value modification processing performed by the control device 1. The control device 1 performs the threshold value modification processing according to the flowchart illustrated in FIG. 6 for each predetermined control cycle.

The control device 1 determines whether or not the vehicle C is located at a tunnel entrance in the first step ST201. More specifically, if the navigation device 15 outputs "a signal indicating that the vehicle C is located at a tunnel entrance," the control device 1 determines that the vehicle C is located at the tunnel entrance, while, unless the navigation device 15 outputs the signal, the control device 1 determines that the vehicle C is not located at a tunnel entrance.

The method of determining whether or not the vehicle C is located at a tunnel entrance is not limited to the method of this embodiment, but may be a method of detecting a tunnel entrance, for example, by performing image processing on the image captured by the camera 11 (for example, performing shape recognition with pattern matching). Moreover, in this step, it may be determined whether or not the vehicle C is located in a path where natural light is blocked (for example, a tunnel or an elevated bridge), instead of determining whether or not the vehicle C is located at a tunnel entrance.

If determining that the vehicle C is not located at a tunnel entrance in step ST201, the control device 1 proceeds to step ST202. In step ST202, the control device 1 determines whether or not the vehicle C is determined to be located in an artificial light environment in step ST203 in the previous control cycle.

The control device 1 proceeds to step ST203 if determining "the vehicle C is located at a tunnel entrance in step ST201" or determining "the vehicle C has been determined to be located in an artificial light environment in the previous control cycle in step ST202." In step ST203, the control device 1 determines whether or not the vehicle C is located in an artificial light environment (performs the artificial light environment determination processing). The details of step ST203 will be described later with reference to FIG. 7.

If determining that the vehicle C is located in an artificial light environment in step ST203, the control device 1 proceeds to step ST204. In step ST204, the control device 1 sets the first threshold value I_th1 and the second threshold value I_th2 to the first threshold value I_th1_A for the artificial light environment and the second threshold value I_th2_A for the artificial light environment, respectively (See FIG. 5B). If the processing of step ST204 is completed, the control device 1 ends this flowchart.

The control device 1 proceeds to step ST205 if determining "the vehicle C has not been determined to be located in an artificial light environment in the previous control cycle in step ST202" or "the vehicle C is not located in an artificial light environment in step ST203." In step ST205, the control device 1 sets the first threshold value I_th1 and the second threshold value I_th2 to the first threshold value I_th1_N for the natural light environment and the second threshold value I_th2_N for the natural light environment, respectively (See FIG. 5B). If the processing of step ST205 is completed, the control device 1 ends this flowchart.

Note here that the above first threshold value I_th1_A for the artificial light environment is set relatively higher than the above first threshold value I_th1_N for the natural light environment. Additionally, the above second threshold value I_th2_A for the artificial light environment is set relatively higher than the above second threshold value I_th2_N for the natural light environment.

Furthermore, the above four threshold values I_th1_A, I_th2_A, I_th1_N, and I_th2_N are set so that a difference $\Delta I\_th\_A$ between the above two threshold values I_th1_A and I_th2_A for the artificial light environment (hereinafter, the difference is referred to as "threshold value difference for the artificial light environment") is larger than a difference $\Delta I\_th\_N$ between the above two threshold values I_th1_N and I_th2_N for the natural light environment (hereinafter, the difference is referred to as "threshold value difference for the natural light environment").

Thereby, when the lamp 12 is turned off after a change from the turned-off state to the turned-on state and when the lamp 12 is turned on after a change from the turned-on state to the turned-off state, the surrounding illuminance I needs to change more drastically (more greatly than the threshold value difference that has increased).

The diagram FIG. 5B illustrates a comparison of a difference in a change of the state of the lamp 12 between when the first threshold value I_th1 and the second threshold value I_th2 are set to the threshold values I_th1_A and I_th2_A for the artificial light environment respectively and when the first threshold value I_th1 and the second threshold value I_th2 are set to the threshold values I_th1_N and I_th2_N for the natural light environment respectively, under the same time variation of the surrounding illuminance I. In FIG. 5B, the horizontal axis represents time and the vertical axis represents the surrounding illuminance I.

The time variation of the surrounding illuminance I in FIG. 5B illustrates a case where the surrounding illuminance I has largely changed due to a long artificial light arrangement interval or the like in the case where the vehicle C is running in an artificial light environment.

When the first threshold value I_th1 and the second threshold value I_th2 are set to the threshold values I_th1_N and I_th2_N for the natural light environment, respectively, the lamp 12 is switched between the turned-off state and the turned-on state at five time points t22, t23, t24, t25, and t26. On the other hand, when the first threshold value I_th1 and the second threshold value I_th2 are set to the threshold values I_th1_A and I_th2_A for the artificial light environment, respectively, the lamp 12 is switched between the turned-off state and the turned-on state at only one time point t21.

In this manner, when the vehicle C is running in the artificial light environment, the turn on/off action of the lamp 12 is suppressed from being frequently repeated by increasing the threshold value difference, even if the surrounding illuminance I has largely changed frequently due to a long artificial light arrangement interval or the like (in the example illustrated in FIG. 5B, the number of switching times is decreased from five to one).

Moreover, the threshold values I_th1_A and I_th2_A for the artificial light environment are set so as to be relatively higher than the threshold values I_th1_N and I_th2_N for the natural light environment, respectively. Thereby, in the case where the vehicle C is located in the artificial light environment, the first threshold value I_th1 and the second threshold value I_th2 are higher than those in the case where the vehicle C is not located in the artificial light environment.

The first threshold value I_th1 set high enables the lamp 12 to easily change from the turned-off state to the turned-on state in the artificial light environment, even in the case where the surroundings of the vehicle C are relatively light (in the case where the surrounding illuminance I is high such as, for example, in the case where the vehicle C is located in an artificial light environment where high-intensity illumination is used).

Moreover, the second threshold value I_th2 set high enables the lamp 12 to be easily maintained in the turned-on state under the artificial light environment, even in the case where the surroundings of the vehicle C are relatively light (in the case where the surrounding illuminance I is high).

In this manner, the threshold values I_th1_A and I_th2_A for the artificial light environment are set higher than the threshold values I_th1_N and I_th2_N for the natural light environment, respectively. The above settings enable the lamp 12 to be automatically turned on or to be maintained in the turned-on state in the case where the vehicle C is located in the artificial light environment such as in a situation where a driver feels like using the lamp 12 to output illumination light to the outside or in a situation where it is desirable to output the illumination light, even if the surroundings of the vehicle C are relatively light (the surrounding illuminance I is high).

Incidentally, steps ST203 to ST205 correspond to processing performed by the threshold value modification unit 83.

[2-4. Artificial Light Environment Determination Processing]

Figure 7:
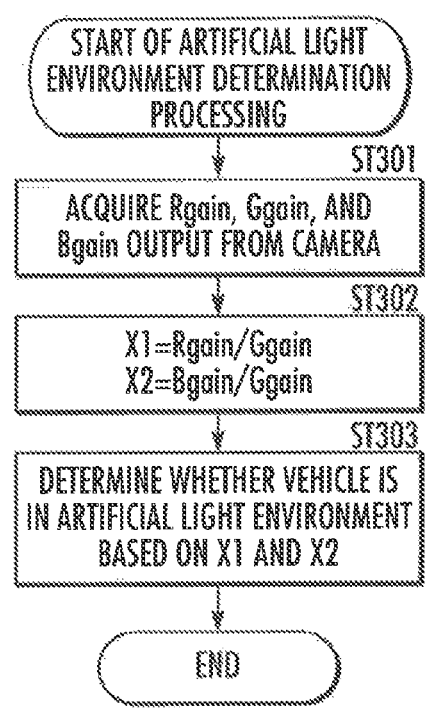
FIG. 7 is a flowchart illustrating a processing procedure for determining an artificial light environment of step ST203 in FIG. 6.
Figure 8:
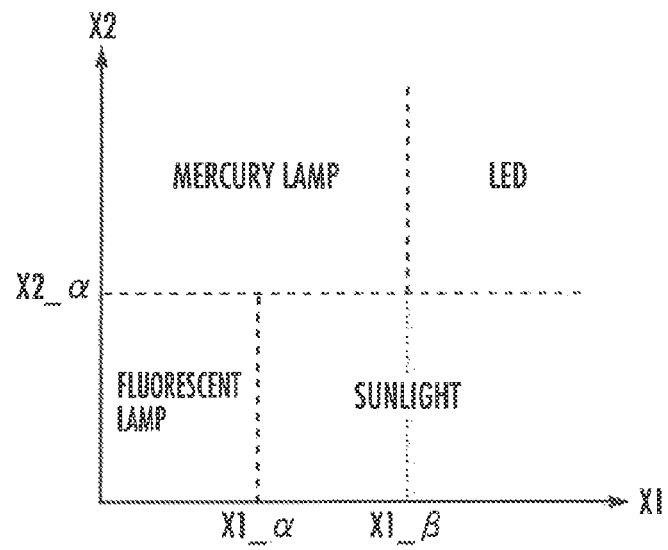
FIG. 8 is an explanatory diagram of the processing of step ST303 in FIG. 7.

Referring to FIGS. 7 and 8, the following describes the details of the artificial light environment determination processing (step ST203 in FIG. 6) performed by the control device 1.

In the first step ST301, the control device 1 acquires the red gain Rgain, the green gain Ggain, and the blue gain Bgain output from the camera 11.

The control device 1 subsequently proceeds to step ST302 to calculate a first gain ratio X1 by dividing the red gain Rgain by the green gain Ggain and to calculate a second gain ratio X2 by dividing the blue gain Bgain by the green gain Ggain.

The control device 1 subsequently proceeds step ST303 to determine whether the vehicle C is in an artificial light environment on the basis of the first gain ratio X1 and the second gain ratio X2 obtained in step ST302. Here, the control device 1 determines whether or not the vehicle C is located in the artificial light environment on the basis of a map as illustrated in FIG. 8.

In FIG. 8, the horizontal axis represents the first gain ratio X1 and the vertical axis represents the second gain ratio X2. As illustrated in FIG. 8, the types of light sources are classified according to each of the gain ratios X1 and X2.

In FIG. 8, if the first gain ratio X1 is less than a predetermined value X1_$\alpha$ and the second gain ratio X2 is less than a predetermined value X2_$\alpha$, the light source is a fluorescent lamp (artificial light). If the first gain ratio X1 is equal to or more than the predetermined value X1_$\alpha$ and the second gain ratio X2 is less than the predetermined value X2_$\alpha$, the light source is sunlight (natural light). If the first gain ratio X1 is less than a predetermined value X1_$\beta$ (greater than the value X1_$\alpha$) and the second gain ratio X2 is equal to or more than the predetermined value X2_$\alpha$, the light source is a mercury lamp (artificial light). If the first gain ratio X1 is equal to or more than the predetermined value X1_$\beta$ and the second gain ratio X2 is equal to or more than the predetermined value X2_$\alpha$, the light source is an LED (light emitting diode: artificial light).

FIG. 8 is a diagram illustrating an example of the types of light sources with respect to each of the gain ratios X1 and X2. The correspondence between the gain ratios X1 and X2 and the types of light sources varies according to a method or the like of deciding the gain ratios X1 and X2.

If the processing of this step ST303 is completed, the control device 1 ends the flowchart.

[2-5. Second Turn on/Off Determination Processing]

Figure 9:
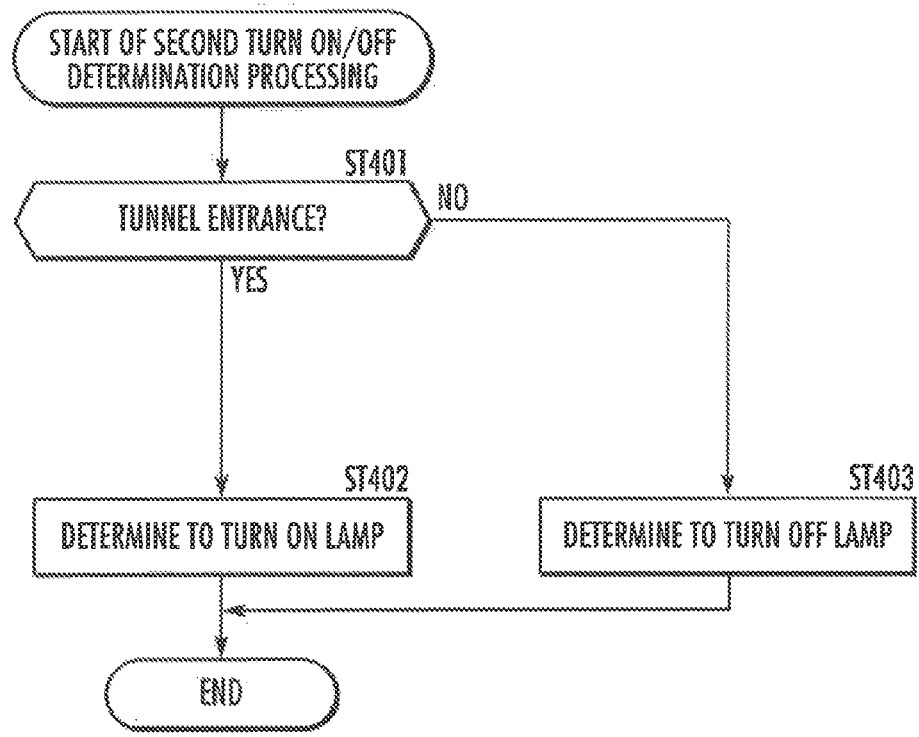
FIG. 9 is a flowchart illustrating a processing procedure for second turn on/off determination processing in the vehicle lamp control device illustrated in FIG. 1.

Referring to FIG. 9, the details of the second turn on/off determination processing performed by the control device 1 will be described below.

In the first step ST401, the control device 1 determines whether or not the vehicle C is located at a tunnel entrance. This processing is the same as the processing of step ST201 in FIG. 6 described above.

If determining that the vehicle C is located at a tunnel entrance in step ST401, the control device 1 proceeds to step ST402 to determine to turn on the lamp 12.

If determined that the vehicle C is not located at a tunnel entrance in step ST401, the control device 1 proceeds to step ST403 to determine to turn off the lamp 12.

[2-6. Time Variation in Determination Result of Each Turn on/Off Determination Processing and in Lamp State]

Figure 10:
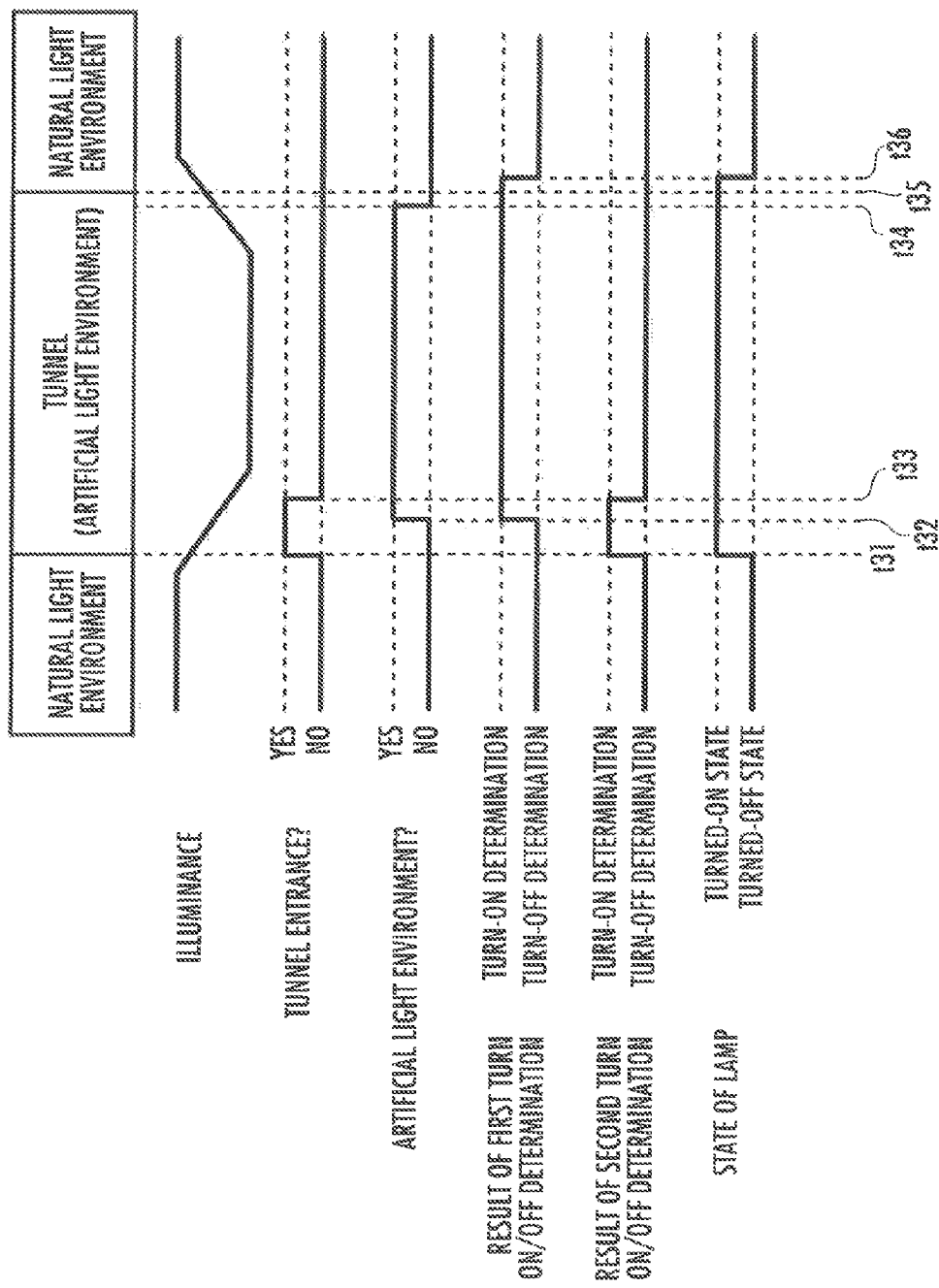
FIG. 10 is a timing chart illustrating the first turn on/off determination processing, the second turn on/off determination processing, and the state of the lamp from before the vehicle C enters a tunnel (an artificial light environment) to after the vehicle C has entered the tunnel.

FIG. 10 is a timing chart illustrating the first turn on/off determination processing, the second turn on/off determination processing, and the state of the lamp from before the vehicle C enters a tunnel (an artificial light environment) to after the vehicle C has entered the tunnel.

In FIG. 10, the horizontal axis represents time. The vehicle C is located in the tunnel between time points t31 and t35.

The surrounding illuminance I gradually decreases from a position slightly short of the tunnel entrance (time point t31) before the vehicle C enters into the tunnel. In the tunnel, the surrounding illuminance I gradually decreases in the vicinity of the entrance and thereafter is maintained constant at a certain level. For better understanding, the illustration is provided in FIG. 10 assuming that no change occurs in the surrounding illuminance I in the tunnel.

Then, the surrounding illuminance I gradually increases during a time period from the time point where the vehicle C is located in the vicinity of the exit of the tunnel until after an elapse of some time after the vehicle C leaves the tunnel.

The result of determination of whether or not the vehicle C is located at a tunnel entrance in step ST201 of FIG. 6 and in step ST401 of FIG. 9 is YES at the tunnel entrance (time point t31). The control device 1 is configured so that the result of determination continues to be YES until a predetermined time elapses after the result of determination turns to YES.

The result of determination of whether or not the vehicle C is located in the artificial light environment in step ST203 of FIG. 6 is YES in a duration (from time point t32 to time point t34) in which the result of determination of whether or not the vehicle C is located at a tunnel entrance (time point t31) is YES.

It is determined that the vehicle C is located in the artificial light environment at time point t32, by which the threshold values I_th1 and I_th2 are modified to the threshold values I_th1_A and I_th2_A for the artificial light environment. Thereby, even if the surrounding illuminance I is higher than the first threshold value I_th1_N for the natural light environment, the first threshold value I_th1 is modified to the first threshold value I_th1_A for the artificial light environment higher than the first threshold value I_th1_N for the natural light environment. Furthermore, if the surrounding illuminance I is lower than the first threshold value I_th1, the result of determination of the first turn on/off determination processing is "turning on the lamp 12" (hereinafter, this result of determination is referred to as "turn-on determination" at the time point t32.

Furthermore, a result of determination "turning off the lamp 12" is referred to as "turn-off determination.) As the result of determination of the first turn on/off determination processing, the turn-on determination continues until time point t36. Specifically, the turn-on determination is obtained as the result of determination of the first turn on/off determination processing from time point t32 to time point t36.

Moreover, the turn-on determination is obtained if the vehicle C is determined to be located at a tunnel entrance as the result of determination of the second turn on/off determination processing, and therefore the turn-on determination is obtained as the result of determination from the time point t31 to the time point t33.

As described above, the lamp 12 is placed in the turned-on state between time point t31 and time point t36. During the time period, the turn-on determination is obtained as the result of determination of only the second turn on/off determination processing between time point t31 and time point t32 and as the result of determination of only the first turn on/off determination processing between time point t33 and time point t36. In this manner, the lamp 12 is placed in the turned-on state by obtaining the turn-on determination as the result of determination in at least one of the first turn on/off determination processing and the second turn on/off determination processing, thereby enabling the lamp 12 to be placed in the turned-on state or maintained in the turned-on state more appropriately.

[3. Variation]

[3-1. Variation Regarding First Threshold Value and Second Threshold Value]

Although the first threshold value and the second threshold value are set so that the difference between the first threshold value and the second threshold value (in other words, the threshold value difference) depends on whether the vehicle C is located in the artificial light environment or the vehicle C is not located in the artificial light environment in this embodiment, the present invention is not limited thereto. For example, the first threshold value and the second threshold value may be modified in such a way that the threshold value difference is maintained constant. Furthermore, the threshold value difference may be zero (in other words, the first threshold value may be the same as the second threshold value).

Furthermore, only one of the first threshold value and the second threshold value may be modified according to the environment in which the vehicle C is located. For example, only the second threshold value may be modified without changing the first threshold value (for example, the second threshold value I_th2_A for the artificial light environment is set so as to be greater than the second threshold value I_th2_N for the natural light environment).

Moreover, the first threshold value I_th1 and the second threshold value I_th2 may be fixed. Specifically, the vehicle lamp control device may be configured without the function of the threshold value modification unit 83.

Furthermore, in this case, the present invention may be configured in such a way that step ST401 of FIG. 9 illustrating the second turn on/off determination processing is changed to a process of "determining whether the vehicle C is located at a tunnel entrance or whether the vehicle C is located in an artificial light environment" and the control proceeds to step ST402 if "the vehicle C is located at the tunnel entrance or the vehicle C is located in the artificial light environment" or proceeds to step ST403 if "the vehicle C is not located at the tunnel entrance or the vehicle C is not located in the artificial light environment."

In this case, it is able to be determined that the lamp 12 should be placed in the turned-on state more easily in the second turn on/off determination processing not only when the vehicle C is located at the tunnel entrance, but also when the vehicle C is located in the tunnel, thereby enabling the state of the lamp 12 to be changed to the turned-on state or to be maintained in the turned-on state more appropriately. In other words, if the vehicle C is located in the artificial light environment (if the vehicle C is located at the tunnel entrance or located in the tunnel), the lamp 12 is able to be placed in the turned-on state independently of the brightness around the vehicle C.

Figure 11:
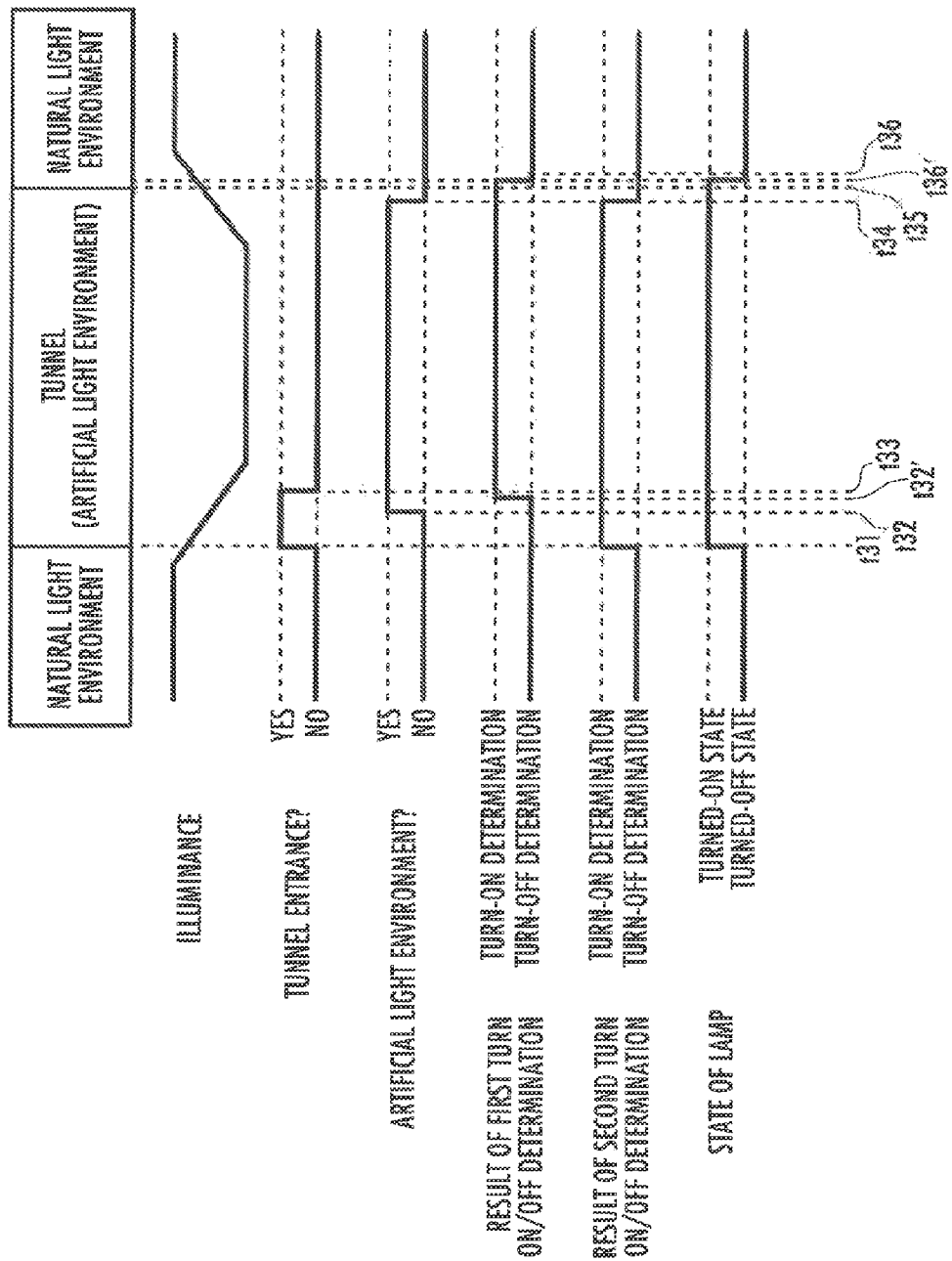
FIG. 11 is a timing chart illustrating the first turn on/off determination processing, the second turn on/off determination processing, and the state of the lamp from before the vehicle C enters a tunnel (an artificial light environment) to after the vehicle C has entered the tunnel in another embodiment.

For example, FIG. 11 is a timing chart illustrating the first turn on/off determination processing, the second turn on/off determination processing, and the state of the lamp before and after the vehicle C enters the tunnel (an artificial light environment) in the above configuration. FIG. 11 is different from FIG. 10 in that the first threshold value I_th1 and the second threshold value I_th2 are not modified and thereby the turn-on determination is not obtained as the result of determination of the first turn on/off determination processing at time point t32, but the turn-on determination is obtained as the result of determination at time point t32' later than the time point t32 (in other words, the time point at which the surrounding illuminance I has decreased to a lower value than at time point t32). Furthermore, the turn-off determination is obtained as the result of determination of the first turn on/off determination processing at time point t36' earlier than time point t36.

On the other hand, the configuration of the second turn on/off determination processing has been changed from the configuration of this embodiment, and thereby the time during which the turn-on determination is obtained as the result of determination of the second turn on/off determination processing has increased by a time period of t33 to t34, so that the time ranges from t31 to t34.

Thereby, the time during which the lamp 12 is placed in the turned-on state ranges from time point t31 to time point t36'. Thus, the time point at which the lamp 12 changes from the turned-on state to the turned-off state is time point t36' which is slightly earlier than time point t36. The lamp 12 changes from the turned-off state to the turned-on state at time point t31 similarly to the embodiment, and therefore the lamp 12 is able to be quickly turned on in a situation where the vehicle C has entered the tunnel (specifically, in a situation where a driver feels like using the lamp 12 to output illumination light to the outside or where it is desirable to output the illumination light).

[3-2. Variation of Threshold Value Modification Processing]

[3-2-1. Example where Tunnel Determination is not Performed]

The vehicle lamp control device may be configured in such a way that the determination of whether or not the vehicle C is located at a tunnel entrance is omitted in the threshold value modification processing. In this case, the vehicle lamp control device is configured without steps ST201 and ST202 in FIG. 6. In addition, in this case, the GPS receiver 14 and the navigation device 15 used for the determination may be omitted.

[3-2-2. Example where Shift to Turned-Off State is Suppressed]

Figure 12:
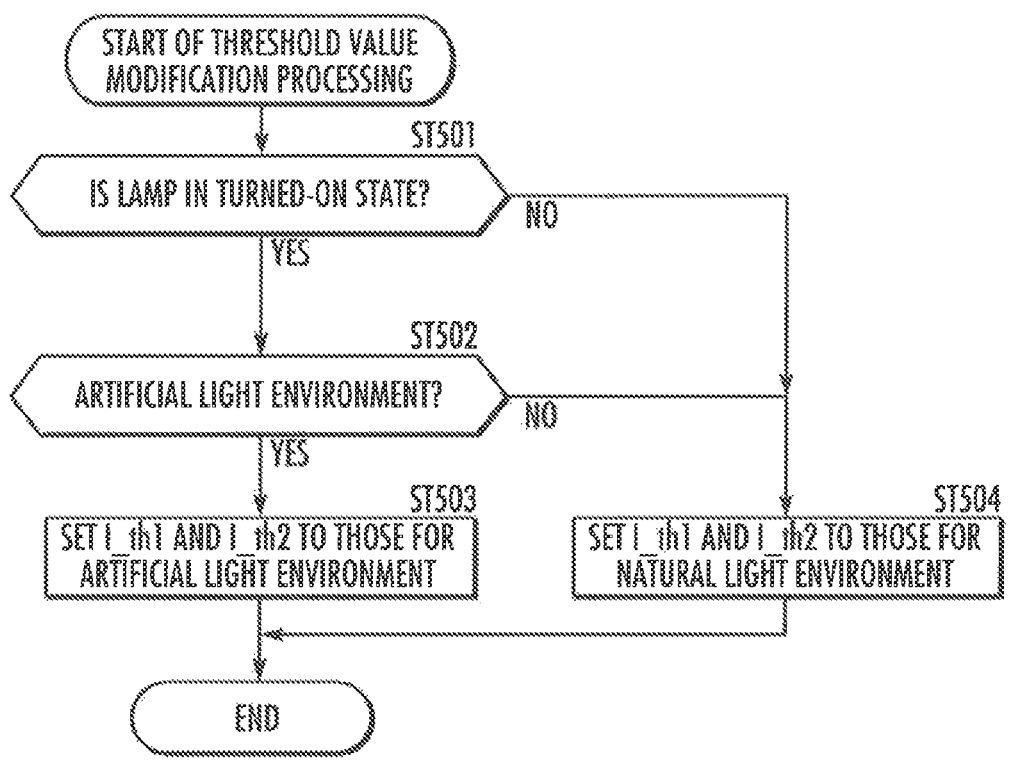
FIG. 12 is a flowchart illustrating a processing procedure for threshold value modification processing of another embodiment.

The vehicle lamp control device may be configured in such a way that the threshold value modification processing is as illustrated in FIG. 12. The threshold value modification processing illustrated in FIG. 12 is processing for making the turned-on state to be maintained more easily when the lamp 12 is placed in the turned-on state. This processing enables the turned-on state of the lamp 12 to be maintained more easily at night, even in the case where the vehicle C is located in a high-intensity artificial light environment.

Hereinafter, the details of the processing illustrated in FIG. 12 will be described.

The vehicle lamp control device determines whether or not the lamp 12 is placed in the turned-on state in the first step ST501.

If determining that the lamp 12 is placed in the turned-on state in step ST501, the vehicle lamp control device proceeds to step ST502 to determine whether or not the vehicle C is located in an artificial light environment. This processing is the above-described artificial light environment determination processing.

If determining that the vehicle C is located in the artificial light environment in step ST502, the vehicle lamp control device proceeds to step ST503. In step ST503, the vehicle lamp control device sets the first threshold value I_th1 and the second threshold value I_th2 to a first threshold value I_th1_A for an artificial light environment and to a second threshold value I_th2_A for an artificial light environment, respectively. If the processing of step ST503 is completed, the vehicle lamp control device ends the flowchart.

Moreover, if determining that the lamp 12 is not placed in the turned-on state in step ST501 or if determining that the vehicle C is not located in an artificial light environment in step ST502, the vehicle lamp control device proceeds to step ST504. In step ST504, the vehicle lamp control device sets the first threshold value I_th1 and the second threshold value I_th2 to a first threshold value I_th1_N for a natural light environment and a second threshold value I_th2_N for a natural light environment, respectively. If the processing of step ST504 is completed, the vehicle lamp control device ends the flowchart.

[3-3. Variation of Artificial Light Environment Determination Processing]

[3-3-1. Example of Using Raw Image]

Although the vehicle lamp control device uses each of the gains Rgain, Ggain, and Bgain output from the camera 11 in the artificial light environment determination processing in the embodiment, the present invention is not limited thereto. For example, in the camera 11 outputting a raw image, the gains Rgain, Ggain, and Bgain may be obtained by using a raw image.

Figure 13:
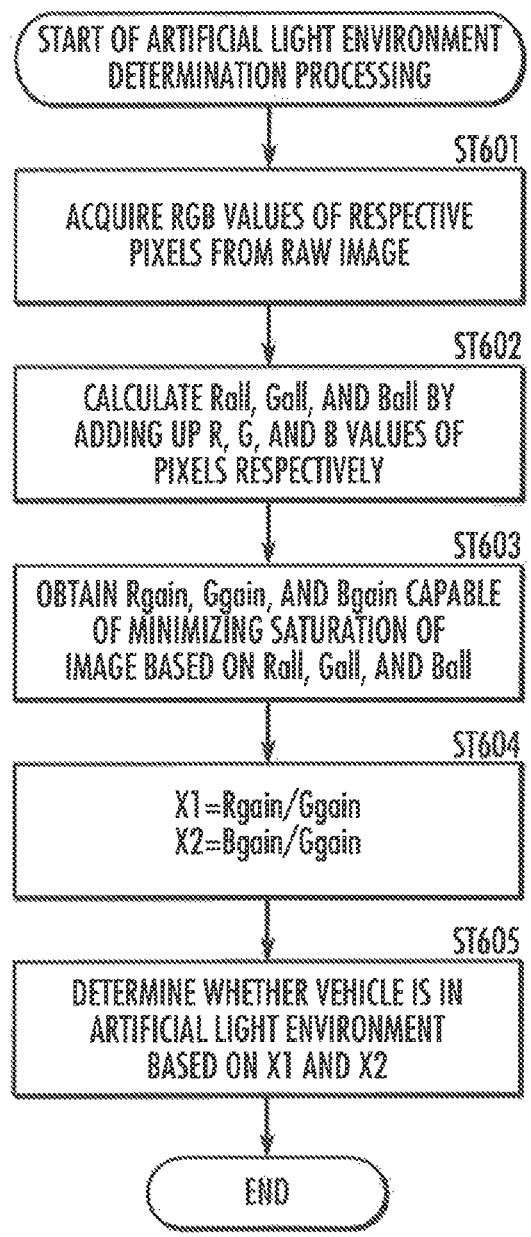
FIG. 13 is a flowchart illustrating a processing procedure for artificial light environment determination processing of another embodiment.

Hereinafter, the details of the artificial light environment determination processing in this case will be described with reference to FIG. 13.

The vehicle lamp control device obtains the R, G, and B values of each pixel from a raw image in the first step ST601 by performing a demosaicing process or the like. The vehicle lamp control device may perform smoothing or removal of disturbance components (for example, reflection components or the like) on the image obtained by performing the demosaicing process to reduce the amount of computation of the subsequent image processing.

The vehicle lamp control device subsequently proceeds to step ST602 to calculate the total values Rall, Gall, and Ball by adding up the R, G, and B values of the pixels, respectively. An object area for which the total values Rall, Gall, and Ball are calculated may be a part of the area of the image, instead of the entire image. Here, a part of the area of the image may be, for example, an image portion of the road surface (or an image portion of the surroundings in addition to the image portion of the road surface).

The vehicle lamp control device subsequently proceeds to step ST603 to obtain the coefficients Rgain, Ggain, and Bgain capable of minimizing the saturation of the image on the basis of the total values Rall, Gall, and Ball. It is based on a way of thinking that a captured image obtained by capturing an image of the nature becomes achromatic if the R, G, and B values of all pixels are added together.

The vehicle lamp control device subsequently proceeds to step ST604 to calculate a first gain ratio X1 by dividing the red gain Rgain by the green gain Ggain and a second gain ratio X2 by dividing the blue gain Bgain by the green gain Ggain. This processing is the same as the processing of step ST302 in FIG. 7 described above.

The vehicle lamp control device subsequently proceeds to step ST605 to determine whether or not the environment is an artificial light environment on the basis of the first gain ratio X1 and the second gain ratio X2 obtained in step ST604. This processing is the same as the processing of step ST303 in FIG. 7 described above.

[3-3-2. Example of Using RGBW Sensor]

In this embodiment, color filters of three primary colors are used as imaging elements of the camera 11. It is, however, possible to use an imaging element having a light-receiving pixel W without a filter incorporated thereon (or with a transparent filter incorporated thereon), in addition to the light-receiving pixels with the color filters of three primary colors, R, G, and B incorporated thereon, as the light-receiving pixels constituting the imaging element.

In this case, the light-receiving pixel corresponding to W has a wide band of the wavelengths of received light in comparison with the light-receiving pixels corresponding to R, G, and B whose band of the wavelength of passing light has been narrowed by the color filters. More specifically, the light-receiving pixels corresponding to R, G, and B receive light from which most of infrared light is excluded through the color filters, while the light-receiving pixel corresponding to W receives also infrared light. Specifically, in the case of receiving light including infrared light, the amount of received light of the light-receiving pixel corresponding to W is greater than that of the light-receiving pixels corresponding to R, G, and B as to the amount of received light of light-receiving pixels relative to the luminance of the imaging object (See FIG. 14).

In FIG. 14, the horizontal axis represents the luminance of the imaging object and the vertical axis represents the gradation values of R, G, B, and W of the pixels, in other words, R value, G value, B value, and W value (or the amounts of received light of the respective light-receiving pixels), which are obtained by performing the demosaicing process on a raw image composed of R, G, B, and W light-receiving pixels. On the vertical axis, the value of zero (0) or close to zero represents a state of black saturation of pixels and the value of B_max or close to B_max (a state where the light-receiving pixels are saturated with respect to the amount of received light or substantially close to saturation) represents a state of halation of the pixels.

Furthermore, in FIG. 14, the R, G, and B values (or the amount of received light of the light-receiving pixels corresponding to R, G, and B) are collectively represented by using the luminance Y calculated from RGB. The luminance Y is calculated by, for example, "Y=0.30*Gr+0.59Gg+0.11Gb" (where Gr, Gg, and Gb represent R, G, and B values, respectively). From FIG. 14, it is understood that the amount of received light of the light-receiving pixel corresponding to W is greater than that of the light-receiving pixel corresponding to Y (in other words, a light-receiving pixel corresponding to one of R, G, and B) as to the amount of received light relative to the luminance of the imaging object.

In the natural light environment, a remarkably high percentage of infrared light is included in the natural light environment in comparison with the artificial light environment. Therefore, the vehicle lamp control device determines that the vehicle C is located in the artificial light environment if the amount of received light of infrared light of the light-receiving pixel corresponding to W is less than a predetermined amount and determines that the vehicle C is not located in the artificial light environment if the amount of received light of infrared light of the light-receiving pixel corresponding to W is equal to or more than the predetermined amount.

In the configuration, whether or not the amount of received light of infrared light is equal to or more than the predetermined amount is determined by calculating a determination value K by using the following expression (1) and determining whether or not the vehicle C is located in the artificial light environment according to the determination value K.

[MATH. 1]

$$K = \frac{1}{x}\sum_{n=1}^{x} \frac{W\_n - W\_b\_max}{Y\_n} \quad (1)$$

Here, x is the number of pixels where neither black saturation nor halation occurs in all of R, G, B, and W (hereinafter, the pixels are referred to as "object pixels"). Y_n is luminance Y of each object pixel. W_n is the amount of received light of the light-receiving pixel corresponding to W of each object pixel. W_b_max is the highest W among pixels where black saturation occurs in Y (in other words, pixels where light-receiving pixels corresponding to any of R, G, and B are black-saturated) in an object image.

As illustrated in the following relational expression (2), the above expression (1) means that a ratio between the gradient of W and the gradient of Y in FIG. 14 is calculated.

[MATH. 2]

$$W = a \cdot x + W\_b\_max \quad (2)$$
$$Y = a' \cdot x$$
$$K = \frac{a}{a'} = \frac{W - W\_b\_max}{Y}$$

Therefore, in the configuration, the vehicle lamp control device is configured to determine that the vehicle C is located in the artificial light environment if the above determination value K is less than the predetermined value and to determine that the vehicle C is not located in the artificial light environment if the above determination value K is equal to or more than the predetermined value.

Although the vehicle lamp control device determines whether or not the vehicle C is located in the artificial light environment by comparing the above determination value K with one threshold value in the above determination, the first threshold value K1 and the second threshold value K2 (a threshold value greater than the first threshold value K1) may be used for the determination.

More specifically, the vehicle lamp control device may determine that the vehicle C is located in the artificial light environment if the determination value K has decreased to be less than the first threshold value K1 in a state where the vehicle C is not located in the artificial light environment and determine that the vehicle C is not located in the artificial light environment if the determination value K has increased to be equal to or more than the second threshold value K2 in a state where the vehicle C is located in the artificial light environment.

[3-4. Variation of Lamp Control Processing]

Moreover, the vehicle lamp control device may be configured without the function of the second turn on/off determination unit 85. In this case, step ST2 of the flowchart in FIG. 3 is omitted. Specifically, the vehicle lamp control device may switch from one of the turned-on state and the turned-off state of the lamp 12 to the other thereof only according to the result of determination obtained by the first turn on/off determination processing.

[3-5. Other Variations]

In the second turn on/off determination processing, the vehicle lamp control device may determine to turn on the lamp 12 if the vehicle C is located at a tunnel entrance and the vehicle C is located in the artificial light environment and determine to turn off the lamp 12 in other cases.

Moreover, the vehicle lamp control device may be configured in such a way that the determination of whether the vehicle C is located at a tunnel entrance is omitted in the threshold value modification processing in the second turn on/off determination processing. In this case, the vehicle lamp control device is configured with step ST401 of FIG. 9 omitted. Additionally, in this case, the GPS receiver 14 and the navigation device 15 used for the determination may be omitted, too.

Furthermore, the vehicle lamp control device may be configured to determine that the vehicle C is located at a tunnel entrance if the time variation in the first gain ratio X1 and the second gain ratio X2 (the variation in each of the gain ratios X1 and X2 in a plurality of images captured at different timings) is equal to or greater than a predetermined amount, in the determination of whether or not the vehicle C is located at a tunnel entrance (for example, step ST201 of FIG. 6 and step ST401 of FIG. 9).

Moreover, although the present invention is configured to detect the brightness around the vehicle C on the basis of the illuminance I output from the illuminance sensor 13 as a method of detecting the brightness around the vehicle C in this embodiment, the present invention is not limited thereto. For example, the present invention may be configured to detect the brightness around the vehicle C on the basis of the luminance of the image captured by the camera 11 (for example, the luminance of an imaged area).

Moreover, although the vehicle lamp control device determines whether or not the vehicle C is located in the artificial light environment on the basis of the color information (the respective gains Rgain, Ggain, and B gain) of the image captured by the camera 11 in this embodiment, the present invention is not limited thereto. For example, the vehicle lamp control device may determine whether or not the vehicle C is located in the artificial light environment by performing image processing (for example, recognizing the shape of illumination by performing shape recognition with pattern matching) on the image captured by the camera 11. In this case, the camera 11 may be a monochrome camera.

The vehicle lamp control device of the present invention is able to be configured by arbitrarily combining various variations as described above.

INDUSTRIAL APPLICABILITY

As described hereinabove, according to the vehicle lamp control device of the present invention, the lamp of a vehicle is able to be turned on appropriately even in a situation where the vehicle is running in an environment illuminated by artificial light, and therefore the vehicle lamp control device is useful for controlling the lamp of the vehicle.

DESCRIPTION OF REFERENCE NUMERALS

1 Control device (Vehicle lamp control device)
I Surrounding illuminance (Brightness around vehicle)
I_th1 First threshold value
I_th2 Second threshold value
C Vehicle
11 Camera
12 Lamp
13 Illuminance sensor
81 Lamp controller
82 Artificial light determination unit
83 Threshold value modification unit
84 First turn on/off determination unit (Turn on/off determination unit)

The invention claimed is:
1. A vehicle lamp control device comprising:
an electric control unit (ECU) programmed to effect vehicle lamp controls and including:
an artificial light determination unit which determines whether or not a vehicle is located in an artificial light environment which is an environment illuminated by artificial light which is artificial illumination light, based on an image of surroundings of the vehicle captured by a camera mounted on the vehicle;
a lamp controller which controls turning on or turning off of a lamp which outputs illumination light to outside of the vehicle based on a determination result by the artificial light determination unit;
a turn on/off determination unit which determines to change the lamp from a turned-off state to a turned-on state in a case where brightness around the vehicle has changed from brightness higher than a predetermined first threshold value to brightness equal to or lower than the first threshold value, and determines to change the lamp from the turned-on state to the turned-off state in a case where the brightness around the vehicle has changed from brightness lower than a second threshold value which is higher than the first threshold value to brightness equal to or higher than the second threshold value; and
a threshold value modification unit which modifies at least one of the first threshold value and the second threshold value in a case where the artificial light determination unit determines that the vehicle is located in the artificial light environment,
wherein the lamp controller controls the turning on or turning off of the lamp based on a determination result of determination of the turn on/off determination unit.

2. The vehicle lamp control device according to claim 1, wherein:
the image captured by the camera is a color image; and
the artificial light determination unit is configured to determine whether or not the vehicle is located in the artificial light environment based on color information of the color image.

3. The vehicle lamp control device according to claim 1, wherein the lamp controller is configured to turn on the lamp in a case where the artificial light determination unit determines that the vehicle is located in the artificial light environment.

4. The vehicle lamp control device according to claim 1, wherein the threshold value modification unit is configured to modify at least one of the first threshold value and the second threshold value so that at least one of the first threshold value and the second threshold value is higher in the case where the artificial light determination unit determines that the vehicle is located in the artificial light environment than in a case where the vehicle is determined not to be located in the artificial light environment.

5. The vehicle lamp control device according to claim 1, wherein the threshold value modification unit is configured to modify at least one of the first threshold value and the second threshold value so that a difference between the first threshold value and the second threshold value is larger in the case where the artificial light determination unit determines that the vehicle is located in the artificial light environment than in a case where the vehicle is determined not to be located in the artificial light environment.

* * * * *